US012761809B2

(12) United States Patent
Shin

(10) Patent No.: US 12,761,809 B2
(45) Date of Patent: Oct. 13, 2026

(54) MEMORY SYSTEM FOR SECURING RELIABILITY AND OPERATING METHOD THEREOF

(71) Applicant: SK hynix Inc., Gyeonggi-do (KR)

(72) Inventor: Seung Hwan Shin, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 5 days.

(21) Appl. No.: 18/986,730

(22) Filed: Dec. 19, 2024

(65) Prior Publication Data

US 2025/0173068 A1 May 29, 2025

Related U.S. Application Data

(63) Continuation of application No. 18/321,770, filed on May 23, 2023, now Pat. No. 12,216,918.

(30) Foreign Application Priority Data

Dec. 19, 2022 (KR) ........................ 10-2022-0178032

(51) Int. Cl.
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2007/0101189 | A1* | 5/2007 | Shinbori | G11B 20/1883 |
| 2020/0160906 | A1* | 5/2020 | Lee | G06F 11/141 |
| 2023/0307061 | A1* | 9/2023 | Konishi | G11C 16/3495 |

* cited by examiner

*Primary Examiner* — Baboucarr Faal
(74) *Attorney, Agent, or Firm* — IP&T GROUP LLP

(57) ABSTRACT

A memory system comprising: a non-volatile memory device including K word lines, and a controller suitable for: selecting maximum N word lines in order from highest ones among counted numbers of times that a read retry operation is performed respectively on the K word lines, managing the selected word lines as first word lines, selecting, as target word lines among the K word lines for each predetermined period, second word lines satisfying a sampling condition and third word lines having the counted number of times exceeding a reference number of times among the first word lines, and performing, without a read request from a host, a media scan operation for checking whether an error occurs in the target word lines, where N is a natural number equal to or greater than 1 and less than or equal to K, and K is a natural number equal to or greater than 2.

17 Claims, 13 Drawing Sheets

MEMORY SYSTEM FOR SECURING RELIABILITY AND OPERATING METHOD THEREOF

CROSS-REFERENCE TO RELATED APPLICATION(S)

The present application is a continuation of U.S. patent application Ser. No. 18/321,770 filed on May 23, 2023, which claims priority under 35 U.S.C. § 119 (a) to Korean Patent Application No. 10-2022-0178032, filed on Dec. 19, 2022, the disclosure of which is incorporated herein by reference in its entirety.

BACKGROUND

1. Field

Various embodiments of the present disclosure generally relate to a memory system, and particularly, to a memory system for securing reliability and an operating method thereof.

2. Description of the Related Art

Recently, a computer environment paradigm has shifted so that the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

Meanwhile, a nonvolatile memory device is a memory device in which data stored therein is retained even when a power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc.

In a computing device, unlike a hard disk, a data storage device implemented as a nonvolatile memory device is advantageous in that it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

Moreover, among non-volatile memory devices, a flash memory uses a method of storing data by changing threshold voltages of memory cells, and reading data by using a predetermined read level. However, the threshold voltages of the memory cells may change as time passes after the data is stored, and thus a read error may occur.

To prevent the read error from occurring, a memory system using a flash memory may perform a media scan operation. The media scan operation may refer to an operation in which the memory system itself reads data of the flash memory and checks whether an error occurs so as to prevent an uncorrectable error from occurring in a memory area that has not been accessed for a long time. When an error beyond a predetermined standard occurs during the media scan operation, the memory system itself may perform an operation of moving the data of the memory area where the error occurs to another memory area.

SUMMARY

Various embodiments of the present disclosure are directed to a memory system capable of controlling whether to apply a media scan operation according to a read retry count for a word line included in a memory device, and an operating method of the memory system.

An embodiment of the present disclosure is a memory system that may include: a memory system may include: a non-volatile memory device including K word lines; and a controller suitable for: selecting maximum N word lines in order from highest ones among counted numbers of times that a read retry operation is performed respectively on the K word lines, managing the selected word lines as first word lines, selecting, as target word lines among the K word lines for each predetermined period, second word lines satisfying a sampling condition and third word lines having the counted number of times exceeding a reference number of times among the first word lines, and performing, without a read request from a host, a media scan operation for checking whether an error occurs in the target word lines. N may be a natural number equal to or greater than 1 and less than or equal to K, and K may be a natural number equal to or greater than 2.

An embodiment of the present disclosure is an operating method of a memory system, that may include: counting a number of times that a read retry operation is performed on each of K word lines; selecting maximum N word lines in order from highest ones among counted number of times; storing the selected maximum N word lines as first word lines in a retry table; a first scan operation of performing, for each predetermined period and without a read request from a host, a media scan operation on one or more second word lines, which satisfy a sampling condition among K word lines to check whether an error occurs the second word lines; and a second scan operation of performing, after the first scan operation for each predetermined period, the media scan operation on third word lines having the counted number of times exceeding a reference number of times among the first word lines. N may be a natural number equal to or greater than 1 and less than or equal to K, and K may be a natural number equal to or greater than 2.

An embodiment of the present disclosure is an operating method of a controller, the operating method may include: selecting, on a periodic basis, a predetermined number of rows within a memory cell array included in a memory device; and controlling the memory device to perform a media scan operation on the selected rows. The selected rows may include a row having at a minimum a reference number of times that a read retry operation is successful thereon.

The technical problems to be achieved by the present disclosure are not limited to those described above, and other technical problems not described will be apparently understood by those skilled in the art, to which the present disclosure pertains, from the following description.

DETAILED DESCRIPTION

Figure 1:
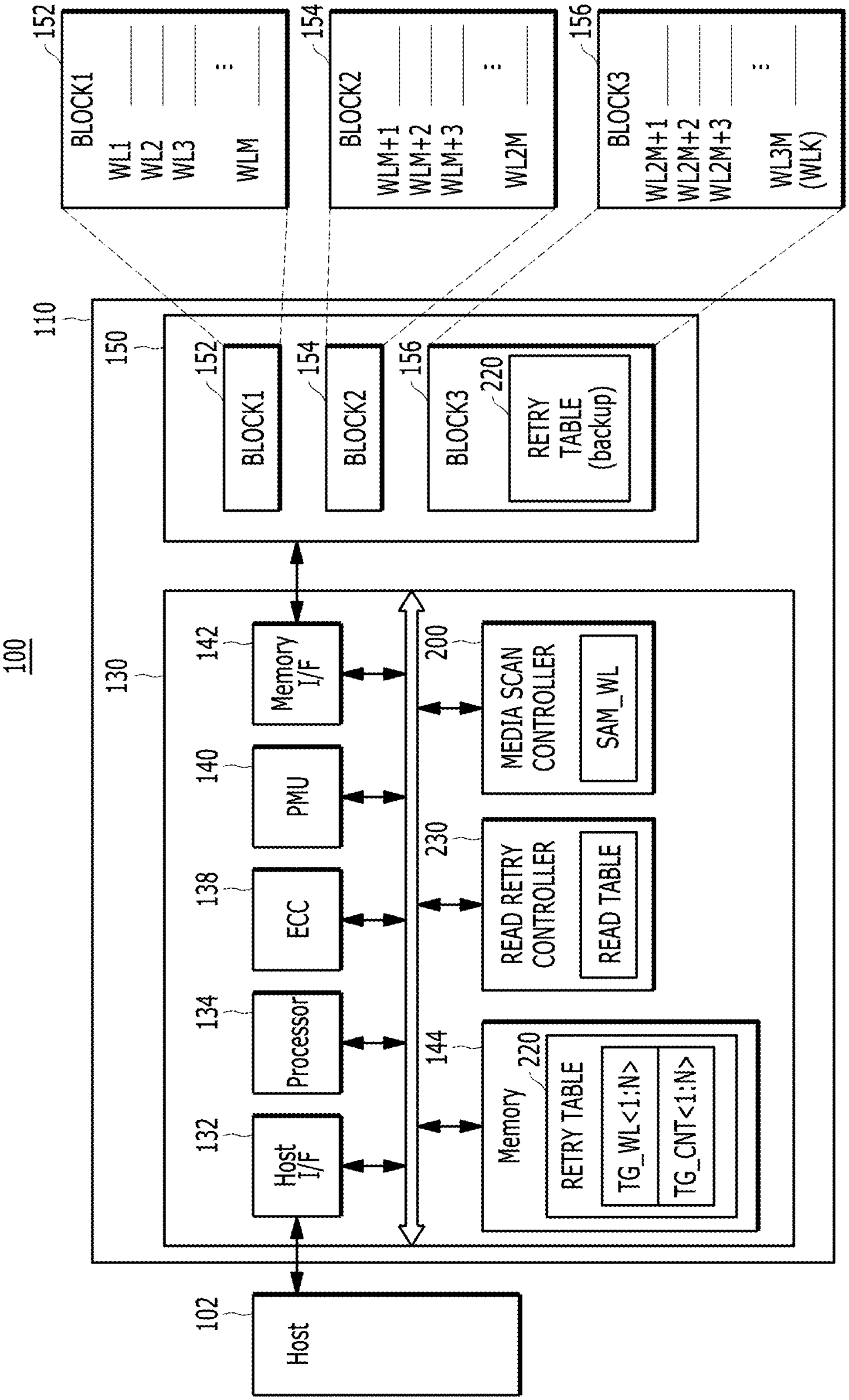
FIG. 1 is a diagram illustrating a data processing system including a memory system in accordance with an embodiment of the present disclosure.

Various embodiments of the present disclosure are described below with reference to the accompanying drawings. Elements and features of this disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor (s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

FIG. 1 is a diagram illustrating a data processing system 100 including a memory system 110 in accordance with an embodiment of the present disclosure.

Figure 2:
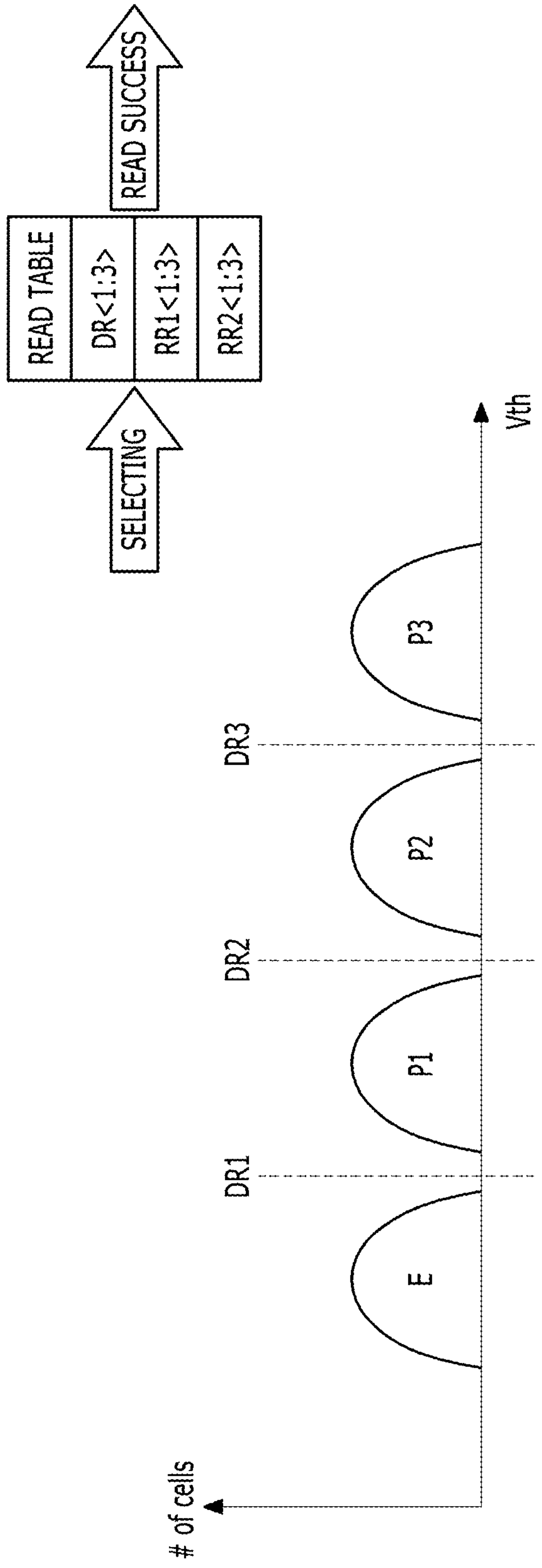
FIGS. 2 and 3 are diagrams for describing a read retry operation in accordance with an embodiment of the present disclosure.
Figure 3:
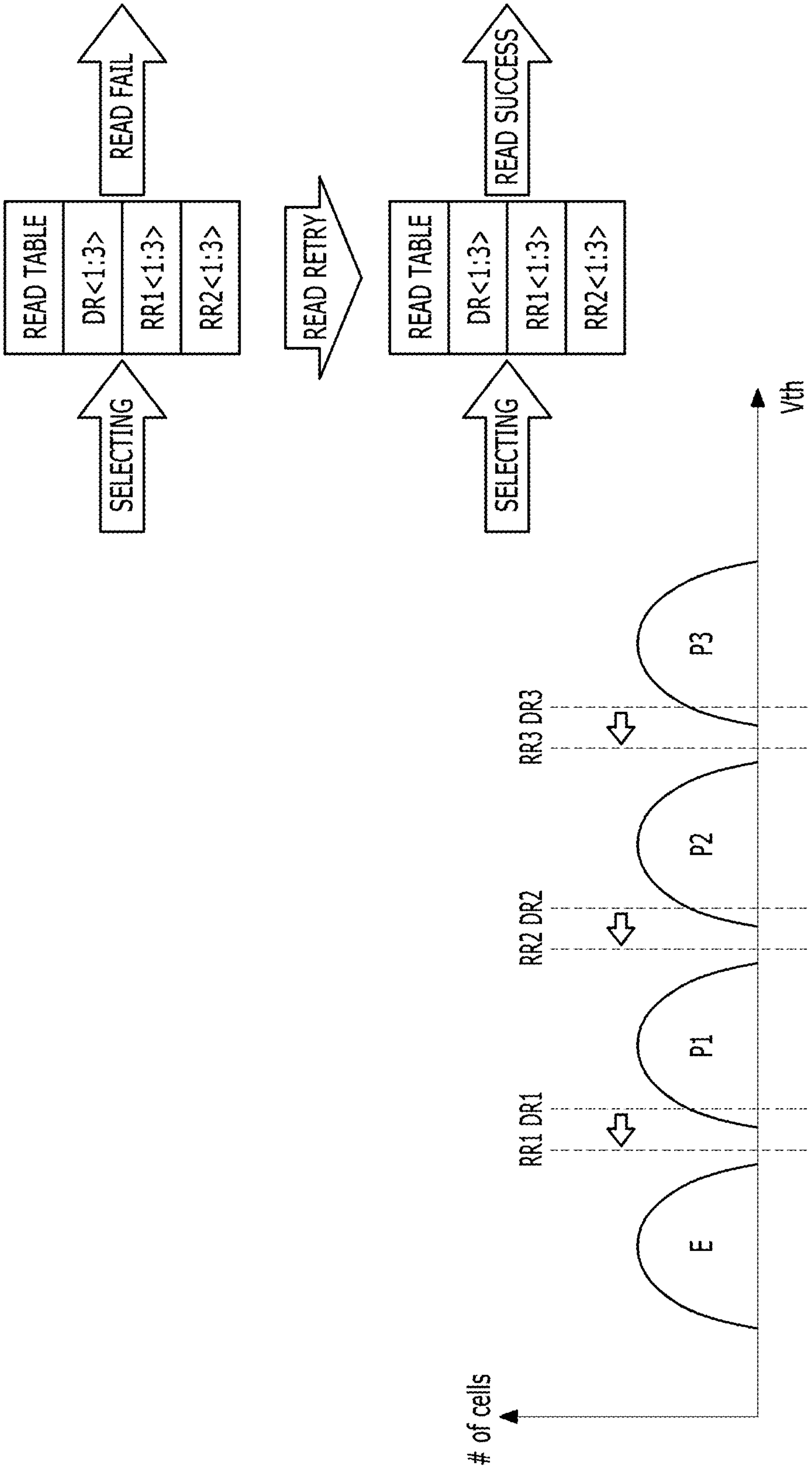

FIGS. 2 and 3 are diagrams for describing a read retry operation in accordance with an embodiment of the present disclosure.

Referring to FIG. 1, the data processing system 100 may include a host 102 engaged or coupled with a memory system 110. For example, the host 102 and the memory system 110 can be coupled to each other via a data bus, a host cable and the like to perform data communication.

The memory system 110 may include a memory device 150 and a controller 130. The memory device 150 and the controller 130 in the memory system 110 may be considered components or elements physically separated from each other. The memory device 150 and the controller 130 may be connected via at least one data path. For example, the data path may include a channel and/or a way.

According to an embodiment, the memory device 150 and the controller 130 may be components or elements functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells included in the memory device 150 is transferred to the controller 130.

The controller 130 may control the memory device 150 to perform read, program, and erase operations corresponding to commands inputted from the host 102, and the memory system 110 may independently perform the operations regardless of commands inputted from an external device such as the host 102.

According to an embodiment, when a program command is inputted from the host 102, the controller 130 may receive program data to be stored in the memory device 150 and logical addresses LA for identifying the corresponding program data from the host 102. The controller 130 may convert the inputted logical addresses into physical addresses PA indicating physical addresses of memory cells in which the program data is to be stored, among memory cells included in the memory device 150. For example, one physical address may correspond to one physical page. The controller 130 may provide the memory device 150 with the program command for storing data, the physical addresses and the program data.

According to another embodiment, when a read command is inputted from the host 102, the controller 130 may receive a logical address corresponding to a read request from the host 102. The logical address corresponding to the read request may be a logical address identifying data requested to be read. The controller 130 may obtain a physical address mapped with the logical address corresponding to the read request from map data indicating a correspondence relationship between the logical address provided by the host 102 and a physical address of the memory device 150. Subsequently, the controller 130 may provide the memory device 150 with the read command and the physical address.

According to another embodiment, during an erase operation, the controller 130 may provide the memory device 150 with an erase command and a physical address of an area to be erased.

In an embodiment, the controller 130 may autonomously generate a command, an address, and data regardless of a request from the host 102, and may transmit the command, the address, and the data to the memory device 150. For example, the controller 130 may provide commands, addresses, and data to the memory device 150 to perform background operations, such as a read operation and a program operation for wear leveling, garbage collection, read reclaim, and media scan.

In an embodiment, the memory device 150 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM).

Examples of the data processing system 100 including the host 102 interworking with the memory system 110 or the memory system 110 may include a mobility electronic device such as an automotive, a portable electronic device such as a mobile phone, an MP3 player and a laptop computer and a non-portable electronic device such as a desktop computer, a game machine, a TV and a projector. The host 102 may provide interaction between the host 102 and a user using the data processing system 100 or the memory system 110 through at least one operating system (OS). The host 102 may transmit a plurality of commands corresponding to requests of the user to the memory system 110, and the memory system 110 may perform operations corresponding to the plurality of commands, i.e., operations corresponding to the requests of the user.

For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The memory device 150 may include a plurality of word lines. In this case, the plurality of word lines included in the memory device 150 may be lines disposed in a row direction. In addition, a plurality of memory cells included in a word line may refer to a plurality of memory cells connected to the word line. For reference, although not illustrated in the drawings, the plurality of word lines included in the memory device 150 may cross bit lines disposed in a column direction, and the plurality of memory cells may be connected between the word lines and the bit lines.

Specifically, the memory device 150 may include K word lines WL1, WL2, WL3, . . . , and WLK each including the plurality of memory cells. In addition, the plurality of memory blocks 152, 154 and 156 included in the memory device 150 may include M word lines WL1, WL2, WL3, . . . , and WLM, WLM+1, WLM+2, WLM+3, . . . , and WL2M, and WL2M+1, WL2M+2, WL2M+3, . . . , and WL3M, respectively, among the K word lines WL1, WL2, WL3, . . . , and WLK. Herein, "K" may be a natural number equal to or greater than 2, "M" may be a natural number equal to or greater than 1 and less than or equal to "K", and "K" may be divisible by "M".

Although in the drawing, 3M is K since the memory device 150 includes three memory blocks 152, 154 and 156, this is merely an example for convenience in description, and in actuality, a smaller or larger number of memory blocks may be included in the memory device 150. In this case, each of the memory blocks may be a unit for performing an erase operation of erasing data stored in the memory device 150. That is, data stored in the same memory block may be simultaneously erased. In addition, each of the memory blocks 152, 154 and 156 may include a page, which is a group of non-volatile memory cells that store data together during a program operation or output data together during a read operation. For example, a plurality of pages may be included in one memory block 152, 154 or 156. A plurality of non-volatile memory cells may be included in one page.

In addition, each of the K word lines WL1, WL2, WL3, . . . , and WLK included in the memory device 150 may logically include one or more pages. That is, depending on the number of bits that may be stored or expressed in one memory cell, the memory cells may be classified into a single level cell (SLC) and a multi-level cell (MLC). In this case, a page may be a unit for storing data in the memory device 150 or reading data stored in the memory device 150. That is, a physical address provided by the controller 130 to the memory device 150 during a program operation or a read operation may be an address for identifying a specific page.

According to an embodiment, when the single level cell is included, each of the K word lines WL1, WL2, WL3, . . . , and WLK may logically include one page. According to another embodiment, when a 2-bit multi-level cell is included, each of the K word lines WL1, WL2, WL3, . . . , and WLK may logically include two pages. According to another embodiment, when a triple level cell (TLC), which is a 3-bit multi-level cell, is included, each of the K word lines WL1, WL2, WL3, . . . , and WLK may logically include three pages. According to another embodiment, when a quadruple level cell (QLC), which is a 4-bit multi-level cell, is included, each of the K word lines WL1, WL2, WL3, . . . , and WLK may logically include four pages.

More specifically, in the memory system 110, the controller 130 may count the number of times that a read retry operation is performed on each of the K word lines WL1, WL2, WL3, . . . , and WLK included in the memory device 150, select maximum N first word lines TG_WL<1:N> having a relatively high counted number of times, and manage the selected maximum N first word lines TG_WL<1:N> in a retry table 220. Accordingly, the retry table 220 may include the maximum N first word lines TG_WL<1:N> and maximum N counted number of times that the read retry operation is performed (hereinafter referred to as "maximum N read retry count") TG_CNT<1:N> corresponding thereto. In this case, the fact that the maximum N first word lines TG_WL<1:N> are managed in the retry table 220 may represent that respective maximum N physical addresses or logical addresses indicating the maximum N first word lines TG_WL<1:N> are stored in the retry table 220. Herein, the read retry operation may refer to a read operation that is performed again by changing a level of a read voltage used in the previous read operation when the read operation fails as an error occurs in the data read through the previous read operation.

The controller 130 may read data stored in a predetermined number of target word lines among the K word lines WL1, WL2, WL3, . . . , and WLK without a read request from the host 102 for each predetermined period, and perform a media scan operation of checking whether an error occurs. The media scan operation may refer to an operation of reading data regardless of the read request from the host 102 to check whether an error occurs, to prevent an uncorrectable error from occurring in a memory area that has not been accessed for a long time. When an error beyond a predetermined standard occurs during the media scan operation, the controller 130 may perform an operation of moving data of a word line where the error has occurred or data of a memory block including the word line to another word line or another memory block.

The controller 130 may preferentially select one or more second word lines SAM_WL, which satisfy a sampling condition among the K word lines WL1, WL2, WL3, . . . , and WLK, and third word lines, which have the count TG_CNT<1:N> exceeding a reference number of times among the maximum N first word lines TG_WL<1:N> stored in the retry table 220 and do not overlap with the second word lines SAM_WL, as target word lines for the media scan operation for each predetermined period. That is, the controller 130 may select the second word lines SAM_WL and the third word lines among the K word lines WL1, WL2, WL3, . . . , and WLK as the target word lines for the media scan operation in preference to the other word lines, for each predetermined period.

The predetermined period may vary according to various parameters for the memory system 110. For example, the predetermined period may vary according to the various parameters including an operating temperature, a program/erase cycle of the memory device 150, an elapsed program time and available capacity.

The controller 130 may select one or more second word lines SAM_WL among the K word lines WL1, WL2, WL3, . . . , and WLK according to sampling conditions determined by a physical location, a program/erase cycle and a read count of each of the K word lines WL1, WL2, WL3, . . . , and WLK, and allow the selected second word lines SAM_WL to be included in the target word lines for the media scan operation. According to an embodiment, the controller 130 may select one or more word lines, which are positioned at a specific physical location in each of the plurality of memory blocks 152, 154 and 156 or each have a program/erase cycle beyond a predetermined standard or a read count beyond a predetermined standard, as the second word lines SAM_WL, and allow the selected second word lines SAM_WL to be included in the target word lines for the media scan operation.

The controller 130 may operate as follows according to a result of comparing each of the number of the first word lines TG_WL<1:N> stored in the retry table 220 and the number of the third word lines each having the count TG_CNT<1:N> exceeding the reference number of times and not overlapping with the second word lines SAM_WL among the first word lines TG_WL<1:N> with a predetermined number.

When the number of the first word lines TG_WL<1:N> and the number of the third word lines each are equal to or greater than the predetermined number, the controller 130 may select a predetermined number of word lines having a relatively high count among the third word lines, and allow the selected word lines to be included together with the second word lines SAM_WL in the target word lines for the media scan operation. That is, only a predetermined number of word lines among the third word lines may be included in the target word lines for the media scan operation.

When the number of the first word lines TG_WL<1:N> is equal to or greater than the predetermined number and the number of the third word lines is less than the predetermined number, the controller 130 may allow fourth word lines, which are randomly selected so as not to overlap with the second word lines SAM_WL from the other word lines except for the third word lines among the first word lines TG_WL<1:N>, to be included together with the third word lines and the second word lines SAM_WL in the target word lines for the media scan operation. In this case, the controller 130 may adjust the number of the fourth word lines to be selected so that the sum of the number of the third word lines and the number of the fourth word lines is the predetermined number.

When the number of the first word lines TG_WL<1:N> is less than the predetermined number, the controller 130 may allow fifth word lines, which are randomly selected not to overlap with the second word lines SAM_WL from the other word lines except for the first word lines TG_WL<1:N> among the K word lines WL1, WL2, WL3, . . . , and WLK, and word lines, which do not overlap with the second word lines SAM_WL among the first word lines TG_WL<1:N>, to be included with the second word lines SAM_WL in the target word lines for the media scan operation. In this case, the controller 130 may adjust the number of fifth word lines to be selected so that the sum of the number of word lines, which do not overlap with the second word lines SAM_WL among the first word lines TG_WL<1:N>, and the number of the fifth word lines is the predetermined number.

For reference, the controller 130 may change the predetermined number according to how many word lines of the K word lines WL1, WL2, WL3, . . . , and WLK are selected as the second word lines SAM_WL for each predetermined period. For example, when 40 word lines among the K word lines WL1, WL2, WL3, . . . , and WLK are selected as the second word lines SAM_WL during a first predetermined period, the predetermined number may be 10, and when 35 word lines among the K word lines WL1, WL2, WL3, . . . , and WLK are selected as the second word lines SAM_WL during a second predetermined period, the predetermined number may be 15.

When the read retry operation performed on sixth word lines on which the previous read operation has failed among the K word lines WL1, WL2, WL3, . . . , and WLK succeeds, the controller 130 may determine the count for the sixth word lines by referring to the retry table 220.

Herein, when an error occurs in data read from the memory device 150 by using a start read voltage according to the read request from the host 102, the read retry operation may refer to an operation of reading the data again from the memory device 150 by using one or more read voltages each having a different level from the start read voltage. The read voltage used during the read retry operation may be a voltage applied to identify data stored in the memory cells. In addition, the controller 130 may include a read table (READ TABLE) including information on a plurality of read voltages, and control the read retry operation by using the plurality of read voltages included in the read table (READ TABLE) in a predetermined order. In this case, the plurality of read voltages included in the read table (READ TABLE) and information on read voltages to be used as the start read voltages among the plurality of read voltages and an order in which the read voltages are used as the start read voltages may be determined in advance by the controller 130 through a test in a production process of the memory device 150.

Specifically, referring to FIGS. 1 to 3, the controller 130 may perform a first read operation on selected word lines among the K word lines WL1, WL2, WL3, . . . , and WLK by using a start read voltage DR<1:3>, in response to the read request received from the host 102.

When an error less than a reference value occurs as a result of performing the first read operation, it may be regarded that the read operation performed on the selected word lines has succeeded (READ SUCCESS).

When an error equal to or greater than the reference value occurs as a result of performing the first read operation, it may be determined that the first read operation performed on the selected word lines has failed (READ FAIL), perform, as a second read operation, a read retry operation (READ RETRY) using a first modified read voltage RR1<1:3> having a different level from the start read voltage DR<1:3> by referring to the read table (READ TABLE), and classify the selected word lines as the sixth word lines.

When an error less than the reference value occurs as a result of performing the second read operation, it may be regarded that the read retry operation (READ RETRY) performed on the sixth word lines has succeeded (READ SUCCESS). In this case, the controller 130 may determine a count for the sixth word lines by referring to the retry table 220.

In this way, when the read retry operation performed on the sixth word lines succeeds, the controller 130 may check whether the sixth word lines are included in the retry table 220.

When it is checked that the sixth word lines are included in the retry table 220, the controller 130 may up-count a read retry count for the sixth word lines included in the retry table 220. That is, when it is checked that the sixth word lines are included in the maximum N first word lines TG_WL<1:N> stored in the retry table 220, the controller 130 may update the retry table 220 by up-counting the read retry count for the checked sixth word lines.

When it is checked that the sixth word lines are not included in the retry table 220, the controller 130 may determine the read retry count for the sixth word lines as a predetermined number of times smaller than the reference number of times. That is, when it is checked that the sixth word lines are not included in the maximum N first word lines TG_WL<1:N> stored in the retry table 220, the controller 130 may determine the read retry count for the sixth word lines as the predetermined number of times less than the reference number of times. According to an embodiment, the predetermined number of times may be "1".

When an empty space is present in the retry table 220 after the read retry count for the sixth word lines is determined as the predetermined number, the controller 130 may allow the sixth word lines to be included in the empty space. That is, when the number of the first word lines TG_WL<1:N> stored in the retry table 220 is less than "N", the controller 130 may store the sixth word lines as new first word lines TG_WL<1:N> in the retry table 220.

When an empty space is not present in the retry table 220, and one or more seventh word lines for which the read retry count is the predetermined number is included among the first word lines TG_WL<1:N> stored in the retry table 220 after the read retry count for the sixth word lines is determined as the predetermined number of times, the controller 130 may allow the sixth word lines to be included in the retry table 220 by replacing one of the one or more seventh word lines. That is, when the N first word lines TG_WL<1:N> are stored in the retry table 220, and one or more seventh word lines for which the read retry count is the predetermined number of times are present among the N first word lines TG_WL<1:N>, the controller 130 may delete any one seventh word line from the retry table 220, and store the sixth word lines instead of the erased seventh word line as new first word lines TG_WL<1:N> in the retry table 220.

When an empty space is not present in the retry table 220, and the smallest read retry count exceeds the predetermined number of times among the first word lines TG_WL<1:N> stored in the retry table 220 after the read retry count for the sixth word lines is determined as the predetermined number of times, the controller 130 might not allow the sixth word lines to be included in the retry table 220. That is, when the N first word lines TG_WL<1:N> are stored in the retry table 220, and the smallest read retry count exceeds the predetermined number of times among the N first word lines TG_WL<1:N>, the controller 130 might not store the sixth word lines in the retry table 220.

For reference, as a result of performing the read retry operation (READ RETRY) using the first modified read voltage RR1<1:3> as the second read operation, an error equal to or greater than the reference value may occur, and thus the read retry operation (READ RETRY) performed on the sixth word lines by the controller 130 may fail. In this case, the controller 130 may perform, as a third read operation, the read retry operation (READ RETRY) using a second modified read voltage RR2<1:3> having a different level from the first modified read voltage RR1<1:3> by referring to the read table (READ TABLE) again. In this way, the read retry operation may be repeatedly performed, and the number of times to perform the read retry operation may be variously defined according to embodiments. In addition, in the drawing, it is illustrated that only three types of read voltages DR<1:3>, RR1<1:3> and RR2<1:3> are included in the read table (READ TABLE). However, this is merely an embodiment, and more types of read voltages may be included in the read table (READ TABLE) according to other embodiments.

The controller 130 may delete a word line, in which data stored in internal memory cells are invalidated or erased among the maximum N first word lines TG_WL<1:N> stored in the retry table 220, from the retry table 220. That is, the controller 130, through a program operation, an erase operation, or a background operation, may invalidate or erase the data stored in the memory cells of the selected word line among the K word lines WL1, WL2, WL3, . . . , and WLK included in the memory device 150. In this case, when it is checked that the selected word line in which the data are invalidated and erased is one of the maximum N first word lines TG_WL<1:N> stored in the retry table 220, the controller 130 may delete the corresponding word line from the retry table 220.

In addition, the controller 130 may store the retry table 220 in the volatile memory device 144 included therein, and back up the retry table 220 stored in the volatile memory device 144 onto the non-volatile memory device 150 for each predetermined period.

According to an embodiment, the controller 130 may include a host interface 132, a processor 134, an error correction circuitry (ECC) 138, a power management unit (PMU) 140, a memory interface (I/F) 142, a memory 144, a read retry controller 230, and a media scan controller 200. Components included in the controller 130 as illustrated in FIG. 1 may vary according to structures, functions, operation performance, or the like, regarding the memory system 110.

The host 102 and the memory system 110 each may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 included in the controller 130 may receive signals, commands (or requests), and/or data input from the host 102 via a bus. For example, the host 102 and the memory system 110 may use a predetermined set of rules or procedures for data communication or a preset interface to transmit and receive data therebetween.

Examples of communication standards or interfaces used to transmit/receive data may include various form factors such as 2.5-inch form factor, 1.8-inch form factor, MO-297, MO-300, M.2, and EDSFF (Enterprise and Data Center SSD Form Factor) and various communication standards or interfaces such as USB (Universal Serial Bus), MMC (Multi-Media Card), PATA (Parallel Advanced Technology Attachment), SCSI (Small Computer System Interface), ESDI (Enhanced Small Disk Interface), IDE (Integrated Drive Electronics), PCIe (Peripheral Component Interconnect Express), SAS (Serial-attached SCSI), SATA (Serial Advanced Technology Attachment), and MIPI (Mobile Industry Processor Interface).

According to an embodiment, the host interface 132 is a type of layer for exchanging data with the host 102 and is implemented with, or driven by, firmware called a host interface layer (HIL). According to an embodiment, the host interface 132 can include a command queue.

The Integrated Drive Electronics (IDE) or Advanced Technology Attachment (ATA) may be used as one of the interfaces for transmitting and receiving data and, for example, may use a cable including 40 wires connected in parallel to support data transmission and data reception between the host 102 and the memory system 110. When a plurality of memory systems 110 are connected to a single host 102, the plurality of memory systems 110 may be divided into a master and a slave by using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces which are used by Integrated Drive Electronics (IDE) devices. The 40 wires in the IDE interface can be reduced to six wires in the SATA interface. For example, 40 parallel signals for the IDE can be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide a high transmission speed, as compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI can support connections of 15 other devices to a single transceiver included in host 102.

Serial Attached SCSI (SAS) can be understood as a serial data communication version of the SCSI. In the SAS, the host 102 and a plurality of peripheral devices are connected in series, and data transmission and reception between the host 102 and each peripheral device may be performed in a serial data communication scheme. The SAS can support connection between the host 102 and the peripheral device through a serial cable instead of a parallel cable, to easily manage equipment using the SAS and enhance or improve operational reliability and communication performance. The SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. The PCIe can use a slot or a specific cable for connecting a computing device (e.g., host 102) and a peripheral device (e.g., memory system 110). For example, the PCIe can use a plurality of pins (e.g., 18 pins, 32 pins, 49 pins, or 82 pins) and at least one wire (e.g., ×1, ×4, ×8, or ×16) to achieve high speed data communication over several hundred MB per second (e.g., 250 MB/s, 500 MB/s, 984.6250 MB/s, or 1969 MB/s). According to an embodiment, the PCIe scheme may achieve bandwidths of tens to hundreds of Giga bits per second. The NVMe can support an operation speed of the non-volatile memory system 110, such as an SSD, that is faster than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and peripheral devices such as a keyboard, a mouse, a joystick, a printer, a scanner, a storage device, a modem, a video camera, and the like. A plurality of peripheral devices such as the memory system 110 may be coupled to a single transceiver included in the host 102.

The read retry controller 230 may control the read retry operation under the control of the processor 134. The read retry operation may be an operation of reading data again from the memory device 150 by using one or more read voltages each having a different level from the start read voltage when an error occurs in data read from the memory device 150 by using the start read voltage according to the read request from the host 102. The read voltage may be a voltage applied to identify data stored in memory cells. The read retry controller 230 may include the read table (READ TABLE) including information on a plurality of read voltages, and control the read retry operation by using the plurality of read voltages included in the read table (READ TABLE) in a predetermined order. In this case, the plurality of read voltages included in the read table (READ TABLE) and information on read voltages to be used as the start read voltages among the plurality of read voltages and an order in which the read voltages are used as the start read voltages may be determined in advance by the read retry controller 230 through a test in a production process of the memory device 150. Descriptions of the read retry operation with reference to FIGS. 2 and 3 have been made above, and thus are omitted herein.

An error may occur in the read data even after the read retry controller 230 repeatedly performs the read operation using all of the plurality of read voltages. In this case, an operation of recovering the data by correcting the error through the ECC 138 described below may be performed.

The error correction unit 138 may check and correct errors in data transmitted between the controller 130 and the memory device 150. The error correction unit 138 may be implemented as a separate module, circuit or firmware in the controller 130, but also be implemented in the memory device 150 according to an embodiment.

The error correction circuitry 138 may include all circuits, modules, systems, and/or devices for performing the error correction operation based on at least one of the above-described codes.

The error correction circuitry 138 can correct error bits of data read from the memory device 150, and may include an error correction code (ECC) encoder and an ECC decoder. The ECC encoder may perform error correction encoding of data to be programmed in the memory device 150 to generate encoded data into which a parity bit is added, and store the encoded data in the memory device 150. The ECC decoder can detect and correct error bits contained in the data read from the memory device 150 when the controller 130 reads the data stored in the memory device 150. For example, after performing error correction decoding on the data read from the memory device 150, the error correction circuitry 138 may determine whether the error correction decoding has succeeded or not, and output an instruction signal, e.g., a correction success signal or a correction fail signal, based on a result of the error correction decoding. The error correction circuitry 138 may use a parity bit, which has been generated during the ECC encoding process for the data stored in the memory device 150, in order to correct the error bits of the read data entries. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like.

An operation performed by the ECC decoder, that is, an operation of detecting and correcting errors included in read data, may be an operation distinct from the above-described read retry operation. According to an embodiment, the controller 130 may perform an error correction decoding operation through the ECC decoder when errors equal to or greater than a reference value occur even though the read retry operation, which is a repeated read operation, has been performed using the plurality of read retry levels.

The power management unit (PMU) 140 may control electrical power provided to the controller 130. The PMU 140 may monitor the electrical power supplied to the memory system 110, e.g., a voltage supplied to the controller 130, and provide the electrical power to components included in the controller 130. The PMU 140 may not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case where the memory device 150 is a flash memory.

For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), a toggle double data rate (DDR), or the like.

The media scan controller 200 may control the media scan operation without the read request from the host 102 for each predetermined period according to the control of the processor 134. The media scan operation may refer to an operation of reading data regardless of the read request from the host 102 to check whether an error has occurred in the data, to prevent an uncorrectable error from occurring in a memory area that has not been accessed for a long time. In this case, the media scan controller 200 may perform, as the media scan operation, an operation of reading data stored in a predetermined number of target word lines among the K word lines WL1, WL2, WL3, . . . , and WLK and checking whether an error occurs in the data. When an error beyond a predetermined standard occurs during the media scan operation, the media scan controller 200 may request the processor 134 to perform an operation of moving data of a corresponding word line in which the error occurs or data of a memory block including the corresponding word line to another word line or another memory block.

The media scan controller 200 may preferentially select one or more second word lines SAM_WL, which satisfy a sampling condition among the K word lines WL1, WL2, WL3, . . . , and WLK, and third word lines, which have the count TG_CNT<1:N> exceeding a reference number of times among the maximum N first word lines TG_WL<1:N> stored in the retry table 220 and do not overlap with the second word lines SAM_WL, as target word lines for the media scan operation for each predetermined period. That is, the media scan controller 200 may select the second word lines SAM_WL and the third word lines among the K word lines WL1, WL2, WL3, . . . , and WLK as the target word lines for the media scan operation in preference to the other word lines, for each predetermined period.

The predetermined period may be defined by the processor 134, and the media scan controller 200 may perform the media scan operation for each predetermined period according to the control of the processor 134. The processor 134 may change the predetermined period according to various parameters for the memory system 110. For example, the processor 134 may change the predetermined period according to the various parameters including an operating temperature, a program/erase cycle of the memory device 150, an elapsed program time and available capacity.

The media scan controller 200 may select one or more second word lines SAM_WL among the K word lines WL1, WL2, WL3, . . . , and WLK according to sampling conditions determined by a physical location, a program/erase cycle and a read count of each of the K word lines WL1, WL2, WL3, . . . , and WLK, and allow the second word lines SAM_WL to be included in the target word lines for the media scan operation. According to an embodiment, the media scan controller 200 may select one or more word lines, which are positioned at a specific physical location in each of the plurality of memory blocks 152, 154 and 156 or each have a program/erase cycle beyond a predetermined standard or a read count beyond a predetermined standard, as the second word lines SAM_WL, and allow the selected word lines to be included in the target word lines for the media scan operation.

The media scan controller 200 may operate as follows according to a result of comparing each of the number of the first word lines TG_WL<1:N> stored in the retry table 220 and the number of the third word lines each having the count TG_CNT<1:N> exceeding the reference number of times and not overlapping with the second word lines SAM_WL among the first word lines TG_WL<1:N> with a predetermined number.

When the number of the first word lines TG_WL<1:N> and the number of the third word lines each are equal to or greater than the predetermined number, the media scan controller 200 may select a predetermined number of word lines having a relatively high count among the third word lines, and allow the selected word lines to be included together with the second word lines SAM_WL in the target word lines for the media scan operation. That is, only a predetermined number of word lines among the third word lines may be included in the target word lines for the media scan operation.

When the number of the first word lines TG_WL<1:N> is equal to or greater than the predetermined number and the number of the third word lines is less than the predetermined number, the media scan controller 200 may allow fourth word lines, which are randomly selected so as not to overlap with the second word lines SAM_WL from the other word lines except for the third word lines among the first word lines TG_WL<1:N>, to be included together with the third word lines and the second word lines SAM_WL in the target word lines for the media scan operation. In this case, the media scan controller 200 may adjust the number of fourth word lines to be selected so that the sum of the number of the third word lines and the number of the fourth word lines is the predetermined number.

When the number of the first word lines TG_WL<1:N> is less than the predetermined number, the media scan controller 200 may allow fifth word lines, which are randomly selected not to overlap with the second word lines SAM_WL from the other word lines except for the first word lines TG_WL<1:N> among the K word lines WL1, WL2, WL3, . . . , and WLK, and word lines, which do not overlap with the second word lines SAM_WL among the first word lines TG_WL<1:N>, to be included with the second word lines SAM_WL in the target word lines for the media scan operation. In this case, the media scan controller 200 may adjust the number of fifth word lines to be selected so that the sum of the number of word lines, which do not overlap with the second word lines SAM_WL among the first word lines TG_WL<1:N>, and the number of the fifth word lines is the predetermined number.

For reference, the media scan controller 200 may change the predetermined number according to how many word lines of the K word lines WL1, WL2, WL3, . . . , and WLK are selected as the second word lines SAM_WL for each predetermined period. For example, when 40 word lines among the K word lines WL1, WL2, WL3, . . . , and WLK are selected as the second word lines SAM_WL during a first predetermined period, the predetermined number may be 10, and when 35 word lines among the K word lines WL1, WL2, WL3, . . . , and WLK are selected as the second word lines SAM_WL during a second predetermined period, the predetermined number may be 15.

The media scan controller 200 may manage the retry table 220 in the memory 144 described below. The processor 134 may back up the retry table 220 stored in the memory 144 onto the non-volatile memory device 150 for each predetermined point in time.

The memory 144 may be used as a working memory of the memory system 110 or the controller 130, while temporarily storing transactional data for operations performed in the memory system 110 and the controller 130. For example, the memory 144 may temporarily store read data entries output from the memory device 150 in response to a read request from the host 102 before the read data entries are output to the host 102. In addition, the controller 130 may temporarily store write data entries input from the host 102 in the memory 144 before programming the write data entries in the memory device 150. When the controller 130 controls operations, such as a data read operation, a data write or program operation, a data erase operation, etc., of the memory device 150, data transmitted between the controller 130 and the memory device 150 of the memory system 110 may be temporarily stored in the memory 144.

In an embodiment, the memory 144 may be implemented with a volatile memory. For example, the memory 144 may be implemented with a static random access memory (SRAM), a dynamic random access memory (DRAM), or both. Although FIG. 1 illustrates, for example, the memory 144 disposed within the controller 130, embodiments are not limited thereto. The memory 144 may be located within or external to the controller 130. For instance, the memory 144 may be embodied by an external volatile memory having a memory interface transferring data and/or signals between the memory 144 and the controller 130. According to an embodiment, the above-described information storage region 161 and retry storage region 162 may be included in the memory 144.

In addition to the read data entries or write data entries, the memory 144 may store information, e.g., map data, read requests, program requests, etc. used for inputting or outputting data between the host 102 and the memory device 150. The memory 144 may store the retry table 220 generated by the media scan controller 200 as described above. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

The processor 134 may control the overall operations of the memory system 110. For example, the processor 134 can control a program operation or a read operation of the memory device 150 in response to a write request or a read request entered from the host 102. The processor 134 may control the read retry operation through the read retry controller 230 as described above. In addition, the processor 134 may control the media scan operation through the media scan controller 200 as described above.

According to an embodiment, the processor 134 may execute firmware to control the program operation or the read operation in the memory system 110. Herein, the firmware may be referred to as a flash translation layer (FTL). An example of the FTL will be described in detail, referring to FIGS. 3 and 4. According to an embodiment, the processor 134 may be implemented with a microprocessor, a central processing unit (CPU), or the like.

According to an embodiment, the memory system 110 may be implemented with at least one multi-core processor. The multi-core processor is a type of circuit or chip in which two or more cores, which are considered distinct processing regions, are integrated. For example, when a plurality of cores in the multi-core processor drive or execute a plurality of flash translation layers (FTLs) independently, a data input/output speed (or performance) of the memory system 110 may be improved. According to an embodiment, the data input/output (I/O) operations in the memory system 110 may be independently performed through different cores in the multi-core processor.

The processor 134 may control operations of the memory system 110. In particular, the processor 134 may control a program operation or a read operation for the memory device 150, in response to a write request or a read request from the host 102. The processor 134 may drive firmware which is referred to as a flash translation layer (FTL), to control general operations of the memory system 110. The processor 134 may be realized by a microprocessor or a central processing unit (CPU).

For instance, the controller 130 may perform an operation requested from the host 102, in the memory device 150. That is, the controller 130 may perform a command operation corresponding to a command received from the host 102, with the memory device 150, through the processor 134 embodied by a microprocessor or a central processing unit (CPU). The controller 130 may perform a foreground operation as a command operation corresponding to a command received from the host 102. For example, the controller 130 may perform a program operation corresponding to a write command, a read operation corresponding to a read command, an erase operation corresponding to an erase command.

The controller 130 may also perform a background operation for the memory device 150, through the processor 134 embodied by a microprocessor or a central processing unit (CPU). The background operation for the memory device 150 may include an operation of copying data stored in a memory block among the memory blocks 152, 154 and 156 of the memory device 150 to another memory block, for example, a garbage collection (GC) operation. The background operation may include an operation of swapping data between one or more of the memory blocks 152, 154 and 156 of the memory device 150, for example, a wear leveling (WL) operation, a read reclaim (RR) operation and media scan operation. The background operation may include an operation of storing map data retrieved from the controller 130 in the memory blocks 152, 154 and 156 of the memory device 150, for example, a map flush operation. The background operation may include a bad management operation for the memory device 150, which may include checking for and processing a bad block among the plurality of memory blocks 152, 154 and 156 in the memory device 150.

FIGS. 4 to 11 are diagrams for describing an operation of managing a retry table 220 in the memory system 110 in accordance with an embodiment of the present disclosure.

Referring to FIGS. 4 to 10, it may be seen that the retry table 220 described with reference to FIG. 1 includes a word line storage space 221 for storing the maximum N first word lines TG_WL<1:N> and a counting storage space 222 for storing the maximum N read retry count TG_CNT<1:N> corresponding to the maximum N first word lines TG_WL<1:N>. The following description is made based on "N" is 5 however "N" can have other values.

Figure 4:
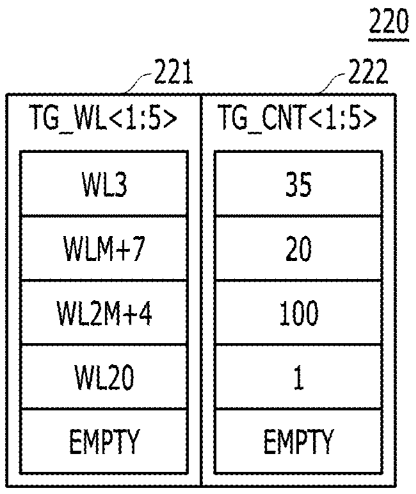
FIGS. 4 to 11 are diagrams for describing an operation of managing a retry table in a memory system in accordance with an embodiment of the present disclosure.

Referring to FIGS. 1 and 4, it may be seen that word line values “WL3, WLM+7, WL2M+4 and WL20” and count “35, 20, 100 and 1” corresponding thereto are stored in respective four spaces TG_WL<1:4> and TG_CNT<1:4> among respective five spaces TG_WL<1:5> and TG_CNT<1:5> included in the refresh table 24, and one space TG_WL<5> or TG_CNT<5> is an empty space. For reference, it may be seen that the word line value “WL3” indicates a third word line of the first memory block 152, the word line value “WLM+7” indicates a seventh word line of the second memory block 154, the word line value “WL2M+4” indicates a fourth word line of the third memory block 156, and the word line value “WL20” indicates a $20^{th}$ word line of the first memory block 152.

Figure 5:
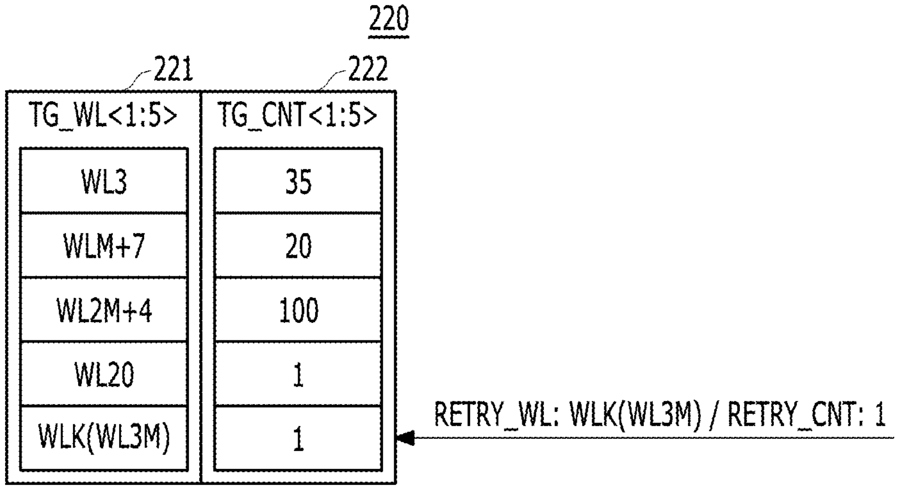

Referring to FIGS. 1 and 5, the controller 130 may check whether a word line value “WLK(WL3M)” has been stored in fourth spaces TG_WL<1:4> in which word line values have been stored among five word line storage spaces TG_WL<1:5> included in the retry table 220 in response to success of the read retry operation performed on a Kth word line WLK, that is, an $M^{th}$ word line WL3M of the third memory block 156.

As a result of the check, the controller 130 may check that the word line value “WLK(WL3M)” is a word line value not stored in the retry table 220.

In addition, the controller 130 may check that empty spaces TG_WL<5> and TG_CNT<5> are present in the retry table 220.

Accordingly, the controller 130 may store “1”, which is the number of times predetermined as the count, together with the word line value “WLK(WL3M)” in the empty spaces TG_WL<5> and TG_CNT<5> of the retry table 220. That is, the word line value “WLK(WL3M)” may be stored in the empty word line storage space TG_WL<5> included in the retry table 220, and the count determined as “1” may be also stored in the corresponding empty counting storage space TG_CNT<5>.

Figure 6:
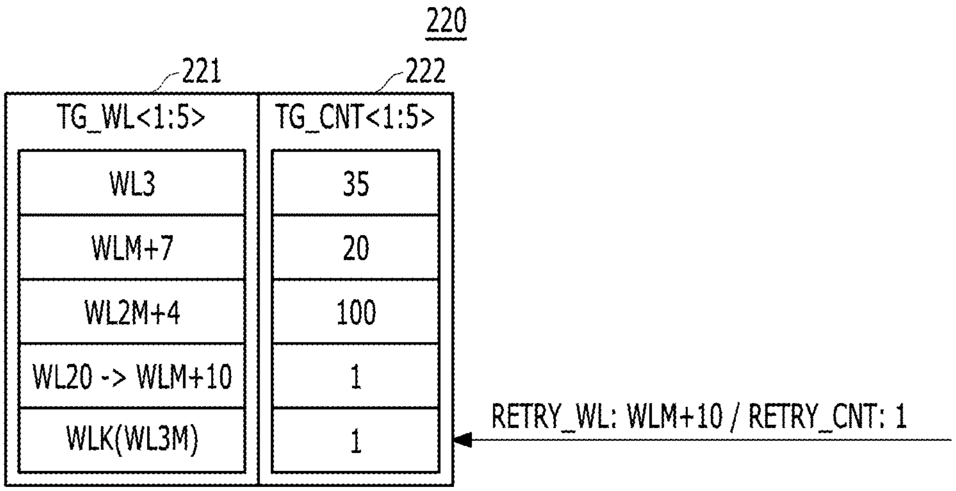

Referring to FIGS. 1 and 6, the controller 130 may check that an empty space is not present because the word line values have been stored in all fifth word line storage spaces TG_WL<1:5> included in the retry table 220 in response to success of the read retry operation performed on a $10^{th}$ word line WLM+10 of the second memory block 154, and check whether the word line value “WLM+10” is present in each of the fifth word line storage spaces TG_WL<1:5>.

As a result of the check, the controller 130 may check that the word line value “WLM+10” is a word line value not stored in the retry table 220.

Therefore, the controller 130 may check whether the count “1” is present in five counting storage spaces TG_CNT<1:5> included in the retry table 220.

As a result of the check, the controller 130 may check that the count “1” has been stored in two counting storage spaces TG_CNT<4:5> included in the retry table 220.

Accordingly, the controller 130 may replace word line values, which have been stored in word line storage spaces TG_WL<4:5> corresponding to one of the two counting storage spaces TG_CNT<4:5> in which the count “1” is stored, and store the word line value “WLM+10” in the word line storage spaces TG_WL<4:5>. It may be seen that the drawing illustrates an operation of selecting the word line storage space TG_WL<4> in which a word line value “WL20” has been stored among the two word line storage spaces TG_WL<4:5> in which the count “1” has been stored, and storing the word line value “WLM+10” instead of the word line value “WL20” in the word line storage space TG_WL<4>.

Unlike the drawing, it is also possible to perform an operation of selecting the word line storage space TG_WL<5> in which a word line value “WLK(WL3M)” has been stored among the two counting storage spaces TG_CNT<4:5> in which the count “1” is stored, and storing the word line “WLM+10” instead of the word line value “WLK(WL3M)” in the word line storage space TG_WL<5>.

Figure 7:
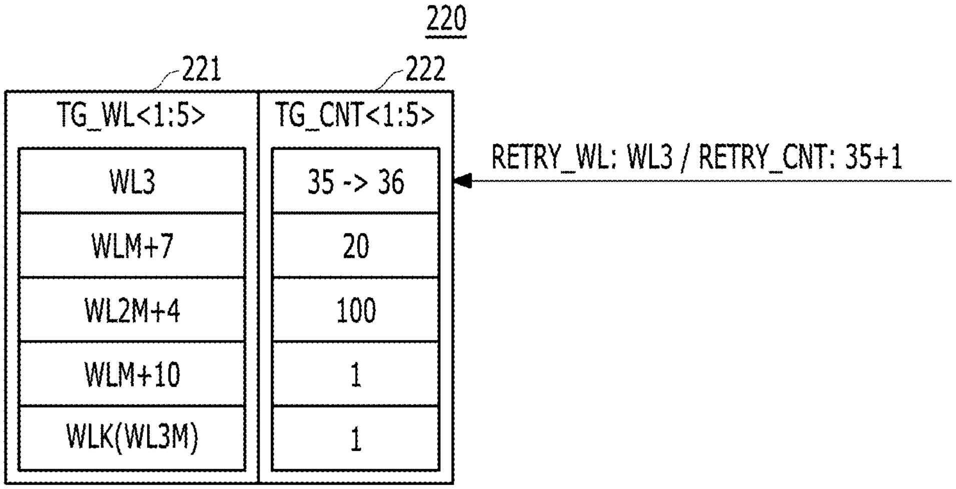

Referring to FIGS. 1 and 7, the controller 130 may check that an empty space is not present because the word line values have been stored in all fifth word line storage spaces TG_WL<1:5> included in the retry table 220 in response to success of the read retry operation performed on a $3^{rd}$ word line WL3 of the first memory block 152, and check whether the word line value “WL3” is present in each of the fifth word line storage spaces TG_WL<1:5>.

As a result of the check, the controller 130 may check that the word line value “WL3” is a word line value stored in the retry table 220.

Accordingly, the controller 130 may check that the count TG_CNT<1> corresponding to the word line value “WL3” is “35” in the retry table 220, determine the read retry count RETRY_CNT of the word line as “36” by up-counting (+1) the count TG_CNT<1>, and update the retry table 220. Consequently, the count TG_CNT<1> corresponding to the word line value “WL3” may be updated from “35” to “36” in the retry table 220.

Figure 8:
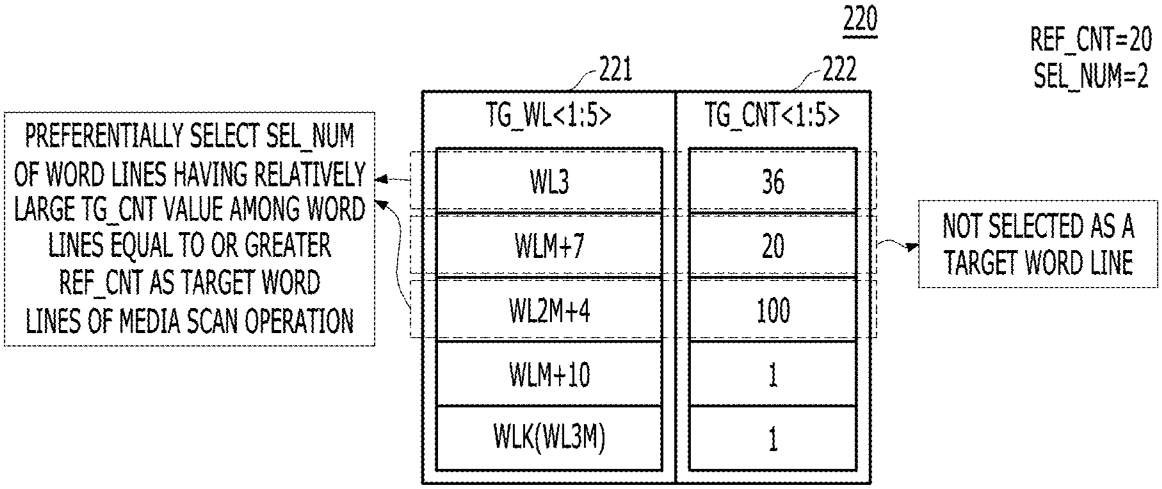

Referring to FIGS. 1 and 8, the controller 130 may classify the word line values “WL3, WLM+7 and WL2M+4”, which have the count TG_CNT<1:5> exceeding a reference number of times REF_CNT of “20” and do not overlap with the second word lines SAM_WL among the word line values of the five first word lines “WL3, WLM+7, WL2M+4, WLM+10 and WLK(WL3M)” stored in the five word line storage spaces TG_WL<1:5> included in the retry table 220, as the third word lines. In this case, since the number of the third word lines is 3 that exceeds a predetermined number SEL_NUM of “2”, the controller 130 may preferentially select two third word lines whose word line values each having a relatively large count among the three third word lines are “WL3 and WL2M+4”, as the target word lines for the media scan operation.

Accordingly, the controller 130 may preferentially select two third word lines whose word line values stored in the retry table 220 together with one or more second word lines SAM_WL satisfying the sampling condition among the K word lines WL1, WL2, WL3, . . . , and WLK are “WL3 and WL2M+4”, as the target word lines for the media scan operation.

For reference, in the drawing, all five first word lines “WL3, WLM+7, WL2M+4, WLM+10 and WLK(WL3M)” stored in the retry table 220 do not overlap with the second word lines SAM_WL.

Figure 9:
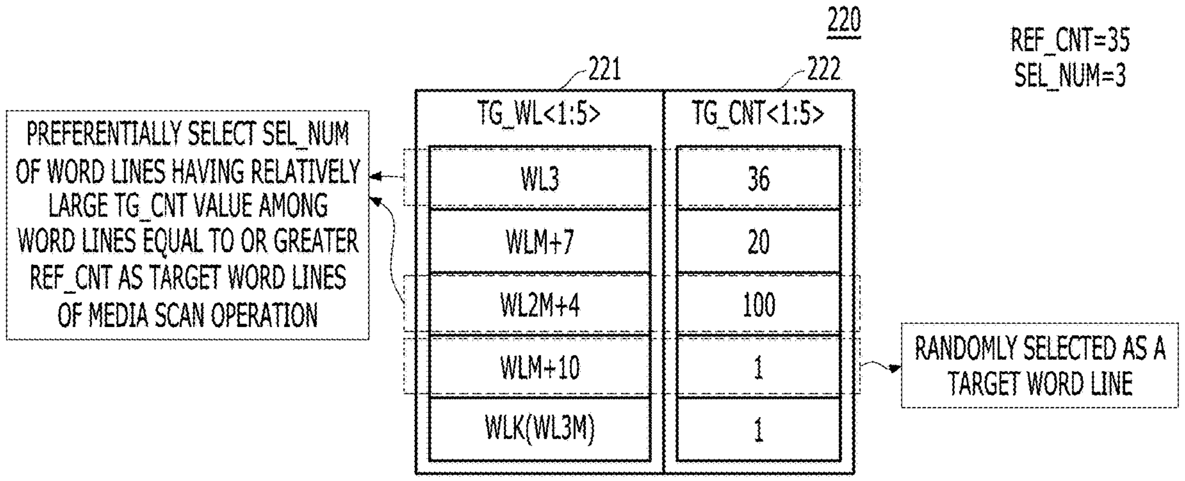

Referring to FIGS. 1 and 9, the controller 130 may classify the word line values “WL3 and WL2M+4”, which have the count TG_CNT<1:5> exceeding a reference number of times REF_CNT of “35” and do not overlap with the second word lines SAM_WL among the word line values of the five first word lines “WL3, WLM+7, WL2M+4, WLM+10 and WLK(WL3M)” stored in the five word line storage spaces TG_WL<1:5> included in the retry table 220, as the third word lines. In this case, since the number of the third word lines is 2 that is equal to or less than a predetermined number SEL_NUM of “3”, the controller 130 may randomly select one of the other three first word line values “WLM+7, WLM+10 and WLK(WL3M)” except for two third word lines among the five first word lines stored in the retry table 220, as the fourth word lines. In the drawing, the word line value "WLM+10" is selected as the fourth word line, and accordingly, two third word lines "WL3 and WL2M+4" and one fourth word line value "WLM+10" may be preferentially selected as the target word lines for the media scan operation.

Accordingly, the controller 130 may preferentially select two third word lines whose word line values stored in the retry table 220 together with one or more second word lines SAM_WL satisfying the sampling condition among the K word lines WL1, WL2, WL3, . . . , and WLK are "WL3 and WL2M+4" and one fourth word line whose word line value is "WLM+10", as the target word lines for the media scan operation.

For reference, in the drawing, none of the five first word lines "WL3, WLM+7, WL2M+4, WLM+10 and WLK (WL3M)" stored in the retry table 220 overlaps with the second word lines SAM_WL. In addition, as the reference number of times REF_CNT and the predetermined number SEL_NUM illustrated in FIG. 8 are different from those illustrated in FIG. 9, the values of the reference number of times REF_CNT and predetermined number SEL_NUM may vary whenever the media scan operation is performed.

Figure 10:
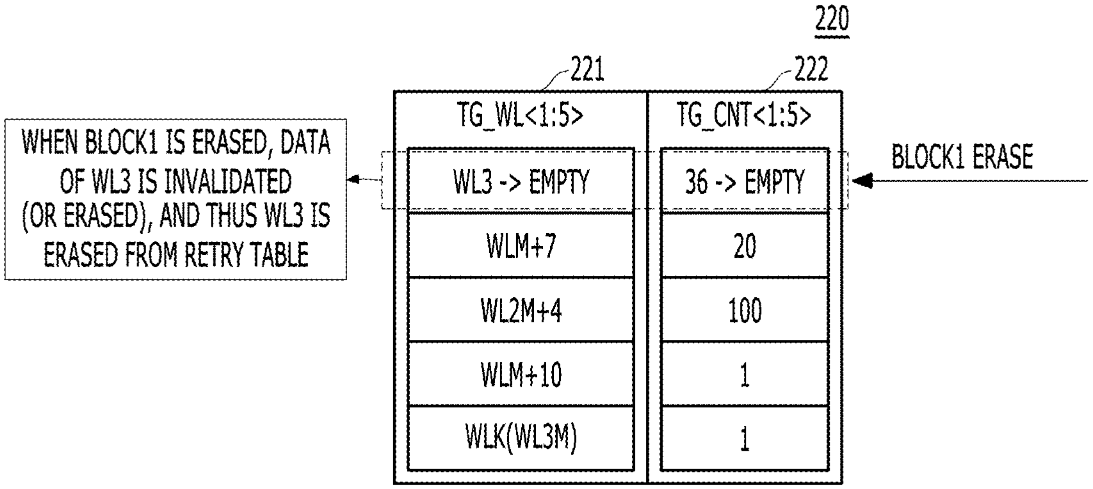

Referring to FIGS. 1 and 10, the controller 130 may erase the first memory block 152 (BLOCK1 ERASE). Accordingly, all M word lines WL<1:5> included in the first memory block 152 may be invalidated or deleted. The controller 130 may delete the word line value "WL3" corresponding to the first memory block 152 among five first word line values "WL3, WLM+7, WL2M+4, WLM+10 and WLK(WL3M)" stored in five word line storage spaces TG_WL<1:5> included in the retry table 220 and a counting value TG_CNT<1> corresponding to the word line value "WL3" from the retry table 220.

Figure 11:
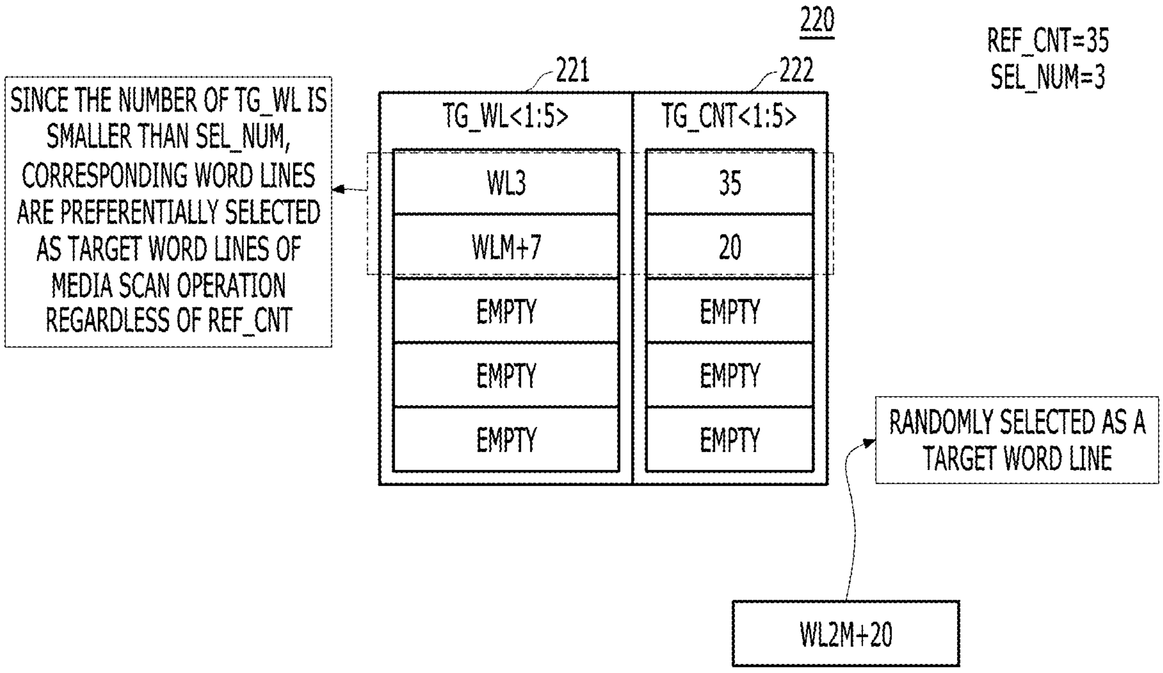

Referring to FIGS. 1 and 11, differently from FIGS. 5 to 10 described above, it may be seen that the word line values "WL3 and WLM+7" and the count "35 and 20" corresponding thereto are stored only in respective two spaces TG_WL<1:2> and TG_CNT<1:2> among the five spaces TG_WL<1:5> and TG_CNT<1:5> included in the refresh table 24, and three spaces TG_WL<3:5> and TG_CNT<3:5> are empty spaces.

In this way, since the number of the first word lines is 2 that is less than or equal to a predetermined number SEL_NUM of "3", the controller 130 may select one fifth word line so as not to overlap with the second word lines SAM_WL from the other word lines except for two first word lines among the K word lines WL1, WL2, WL3, . . . , and WLK. In the drawing, the word line having the word line value "WL2M+20" is selected as the fifth word line, and two first word lines having the word line values "WL3 and WLM+7" and one fifth word line having the word line value "WL2M+20" may preferentially be selected as the target word lines for the media scan operation.

Accordingly, the controller 130 may preferentially select two first word lines having the word line values "WL3 and WL2M+4" and one fifth word line having the word line value "WL2M+20", stored in the retry table 220 together with one or more second word lines SAM_WL satisfying sampling conditions among the K word lines WL1, WL2, WL3, . . . , and WLK, as the target word lines for the media scan operation.

For reference, in the drawing, none of the two first word lines "WL3 and WLM+7" stored in the retry table 220 overlaps with the second word lines SAM_WL.

Figure 12:
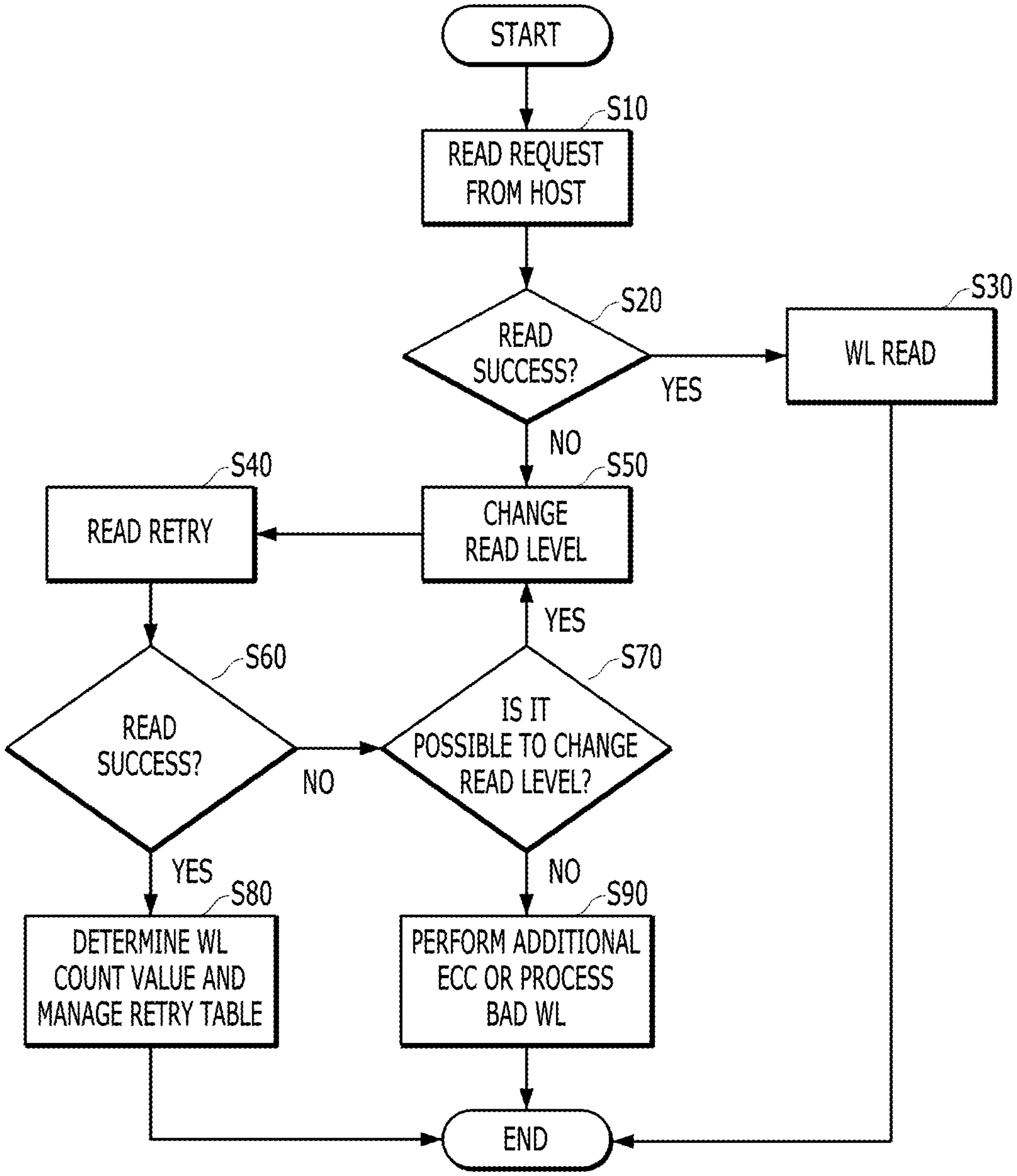
FIGS. 12 and 13 are diagrams for describing an operation of a memory system in accordance with an embodiment of the present disclosure.
Figure 13:
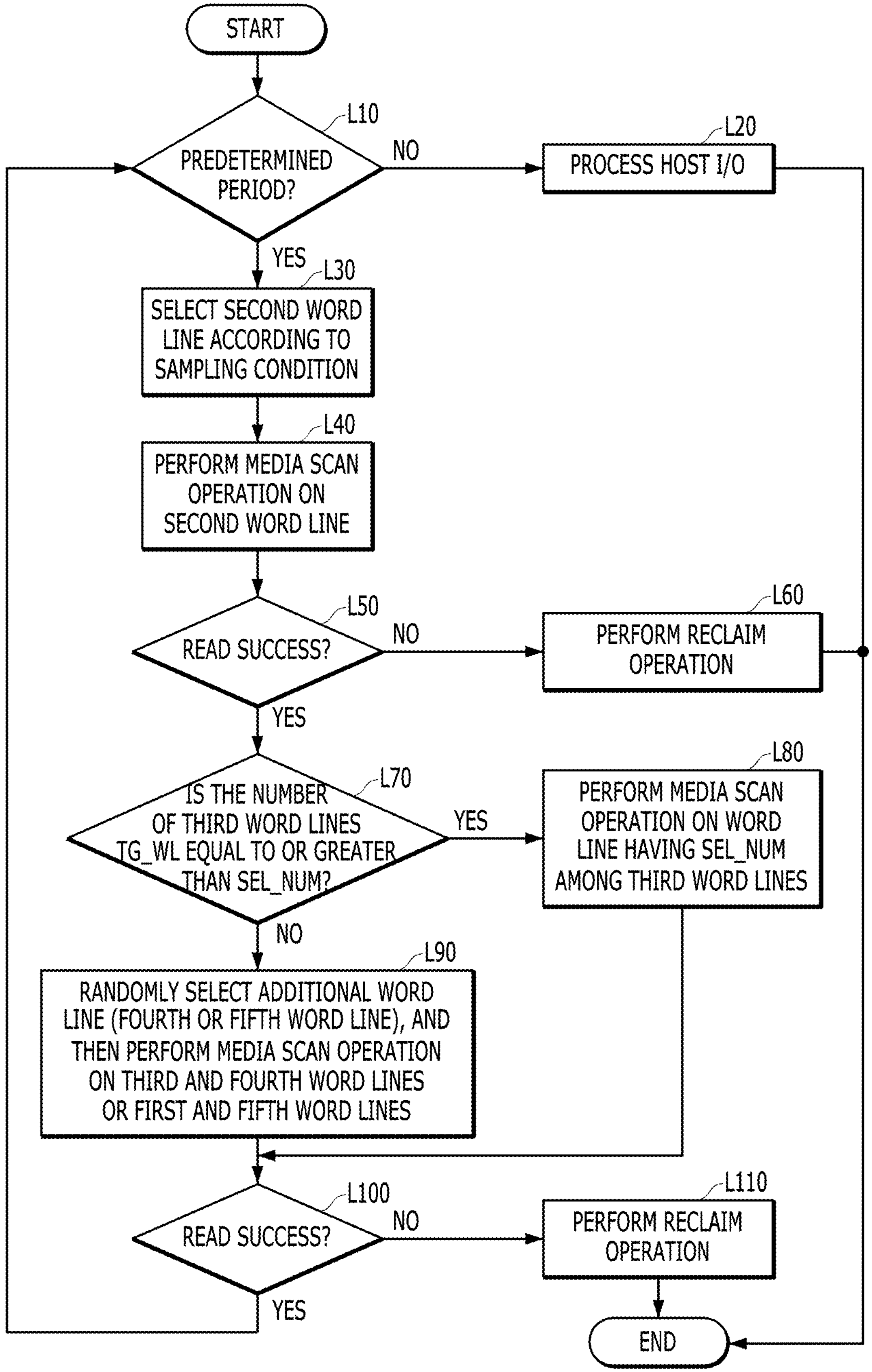

FIGS. 12 and 13 are diagrams for describing an operation of the memory system 110 in accordance with an embodiment of the present disclosure.

Referring to FIGS. 1 and 12, the controller 130 may perform the read operation on a selected word line among the K word lines WL1, WL2, WL3, . . . , and WLK in response to the read request being received from the host 102, in operation S10.

When an error less than a reference value occurs as a result of performing the read operation, it may be regarded that the read operation performed on the selected word line has succeeded (READ SUCCESS) (that is, "YES" in operation S20). Accordingly, the controller 130 may output data of the selected word line to the host 102 in operation S30.

When an error equal to or greater than the reference value occurs as a result of performing the read operation, it may be determined that the read operation on the selected word line has failed (that is, "NO" in the operation S20).

Accordingly, the controller 130 may perform the read retry operation (READ RETRY) using a read voltage having a different level from a read voltage used during the previous read operation, by referring to the read table (READ TABLE), in operations S50 and S40.

When an error less than a reference value occurs as a result of performing the read retry operation (READ RETRY), it may be regarded that the read retry operation (READ RETRY) performed on the selected word line has succeeded (READ SUCCESS) (that is, "YES" in operation S60). Accordingly, the controller 130 may determine a read retry count for the selected word line, and manage the retry table 220 according to the determination, in operation S80. In addition, the controller 130 may output the data of the selected word line to the host 102.

When an error equal to or greater than the reference value occurs as a result of performing the read retry operation (READ RETRY), it may be determined that the read retry operation performed (READ RETRY) on the selected word line has failed (that is, "NO" in the operation S60).

In this case, the controller 130 may check whether it is possible to perform the read retry operation (READ RETRY) again using a read voltage having a different level from a read voltage used during the previous read retry operation, by referring to the read table (READ TABLE), in operation S70.

When it is possible to perform the read retry operation (READ RETRY) again (that is, "YES" in the operation S70), the controller 130 may perform the read retry operation (READ RETRY) using the read voltage having a different voltage from the read voltage used during the previous read retry operation (the operations S50 and S40).

When it is not possible to perform the read retry operation (READ RETRY) again (that is, "NO" in the operation S70), the controller 130 may perform an additional error correction operation on the selected word line or process the selected word line as a bad word line, in operation S90.

Referring to FIGS. 1 and 13, the controller 130 may check whether to reach a predetermined period, in operation L10.

When the controller 130 does not reach the predetermined period (that is, "NO" in operation L10), the controller 130 may process a request from the host 102 in operation L20.

When the controller 130 reaches the predetermined period (that is, "YES" in the operation L10), the controller 130 may select one or more second word lines SAM_WL that satisfy the sampling condition among the K word lines WL1, WL2, WL3, . . . , and WLK, in operation L30.

When the second word lines SAM_WL are completely selected in the operation L30, the controller 130 may perform a media scan operation on the selected second word lines SAM_WL in operation L40.

When an error equal to or greater than a reference value occurs during the media scan operation of operation L40 (that is, "NO" in operation L50), a reclaim operation of copying data of a word line in which the error has occurred among the second word lines SAM_WL to another word line may be performed in operation L60.

After the media scan operation of the operation L40 is completely performed, the controller 130 may select third word lines which have the count TG_CNT<1:N> exceeding the reference number of times among the maximum N first word lines TG_WL<1:N> stored in the retry table 220 and do not overlap with the second word lines SAM_WL. In this case, it may be checked whether the number of selected third word lines is equal to or greater than the predetermined number SEL_NUM, in operation L70.

When the number of the third word lines is equal to or greater than the predetermined number SEL_NUM (that is, "YES" in the operation L70), the controller 130 may perform the media scan operation on a word line having the predetermined number SEL_NUM among the third word lines, in operation L80.

When the number of the third word lines is less than the predetermined number SEL_NUM (that is, "NO" in the operation L70), the controller 130 may randomly select an additional word line, and perform the media scan operation on the third word lines and the additional word line in operation L90. In this case, the additional word line may include fourth word lines which are randomly selected from the other word lines except for the third word lines among the first word lines TG_WL<1:N> when the number of the first word lines TG_WL<1:N> is equal to or greater than the predetermined number SEL_NUM. In addition, the additional word line may include fifth word lines which are randomly selected from the other word lines except for the first word lines TG_WL<1:N> among the K word lines WL1, WL2, WL3, . . . , and WLK when the number of the first word lines TG_WL<1:N> is less than the predetermined number SEL_NUM.

When an error equal to or greater than the reference value occurs during the media scan operation of L80 or L90 (that is, "NO" in operation L100), the controller 130 may perform the reclaim operation of copying data of a word line where the error has occurred among the third word lines to another word line or the reclaim operation of copying data of a word line where the error has occurred among the third word lines and the fourth word lines to another word line or the reclaim operation of copying data of a word line where the error has occurred among the first word lines and the fifth word lines to another word line, in operation S110.

After the media scan operation of L80 or L90 is completely performed, the controller 130 may check whether to reach the predetermined period again, in operation L10.

According to the embodiments of the present disclosure, it is possible to select a word line to be preferentially applied to a media scan operation according to a read retry count for each of a plurality of word lines included in a memory device.

Accordingly, it is possible to effectively perform the media scan operation and improve reliability of data stored in the memory device.

While the present disclosure has been illustrated and described with respect to specific embodiments and drawings, the disclosed embodiments are not intended to be restrictive. Further, it is noted that the present disclosure may be achieved in various ways through substitution, change, and modification, as those skilled in the art will recognize in light of the present disclosure, without departing from the spirit and/or scope of the present disclosure and the following claims.

For example, dispositions and types of the logic gates and transistors described in the aforementioned embodiments may be implemented differently depending on the polarity of an inputted signal. Furthermore, the embodiments may be combined to form additional embodiments.

What is claimed is:

1. An operating method of a controller, the operating method comprising:

counting a number of times that a read retry operation is performed respectively on each of a plurality of rows within a memory cell array included in a memory device;

selecting, on a periodic basis and without a read request, a predetermined number of the rows based on the counted number of times; and controlling the memory device to perform a media scan operation on the selected rows, wherein the selected rows include a row having the counted number of times that exceeds a reference number of times.

2. The operating method of claim 1, wherein the selected rows include the row having a greatest counted number of times among the rows within the memory cell array.

3. The operating method of claim 1, wherein the selected rows further include a randomly selected row.

4. The operating method of claim 1, wherein the selected rows further include rows that satisfy a sampling condition without the read request.

5. The operating method of claim 1, the operating method further comprising performing the read retry operation on rows on which a previous read operation has failed among rows within the memory device.

6. The operating method of claim 1, the operating method further comprising performing a reclaim operation for the selected rows based on a performing result of the media scan operation on the selected rows.

7. A data storage device comprising:

a memory device including a plurality of word lines; and a controller configured to:

count a number of times that a read retry operation is performed respectively on each of the plurality of word lines;

determine a target word line among the plurality of word lines based on whether the counted number of times exceeds a reference number of times without a read request for each predetermined period, perform a media scan operation for checking whether an error occurs in the target word line, and determine whether to perform a reclaim operation for the target word line based on a result of the media scan operation.

8. The data storage device of claim 7, wherein the controller is configured to determine the target word line among a plurality of first word lines that is in order from highest ones of the counted number of times.

9. The data storage device of claim 8, wherein the controller is configured to determine a predetermined number of target word lines, in order from highest ones of the first word lines.

10. The data storage device of claim 8, wherein the controller is configured to determine maximum N word lines of the plurality of word lines as the first word lines, where N is a natural number equal to or greater than 1.

11. The data storage device of claim 8, wherein the controller is further configured to generate and manage a retry table in which information of the first word lines is stored.

12. The data storage device of claim 11, wherein the controller is further configured to determine the counted number of times for a word line on which a previous read operation has failed among the plurality of word lines based on the information of the first word lines stored in the retry table.

13. The data storage device of claim 12, wherein the controller is configured to determine the counted number of times for the word line based on whether the read retry operation is successfully performed on the word line.

14. The data storage device of claim 13, wherein the controller is configured to determine the counted number of times for the word line by up-counting the counted number of times of the word line when the word line is included in the information of the first word lines stored in the retry table.

15. The data storage device of claim 13, wherein the controller is configured to determine the counted number of times for the word line to a predetermined number of times less than the reference number of times when the word line is not included in the information of the first word lines stored in the retry table.

16. The data storage device of claim 15, wherein the controller is configured to manage the information of the first word lines in the retry table to update the word line as one of the first word lines.

17. The data storage device of claim 11, wherein the controller is further configured to store the retry table in the memory device.

* * * * *